US012774224B2

(12) United States Patent
Pawlow et al.

(10) Patent No.: US 12,774,224 B2
(45) Date of Patent: Oct. 27, 2026

(54) BOTTLED WATER DISPENSER WITH A SYSTEM FOR TREATING WATER IN A BOTTLE WITH UV RADIATION

(71) Applicant: Scandinavian Innovation Group Oy, Pomarkku (FI)

(72) Inventors: Andrzej Pawlow, Riga (LV); Arturs Pavlovs, Riga (LV)

(73) Assignee: Scandinavian Innovation Group Oy, Pomarkku (FI)

( * ) Notice: Subject to any disclaimer, the term of this patent is extended or adjusted under 35 U.S.C. 154(b) by 0 days.

(21) Appl. No.: 19/392,037

(22) Filed: Nov. 17, 2025

(65) Prior Publication Data

US 2026/0070816 A1 Mar. 12, 2026

Related U.S. Application Data

(63) Continuation of application No. PCT/IB2024/055351, filed on May 31, 2024.

(30) Foreign Application Priority Data

Jun. 2, 2023 (EP) .................................... 23177105

(51) Int. Cl.
*C02F 1/32* (2023.01)
*B67D 3/00* (2006.01)

(52) U.S. Cl.
CPC ............ *C02F 1/325* (2013.01); *B67D 3/0032* (2013.01); *B67D 2210/00015* (2013.01);
(Continued)

(58) Field of Classification Search
CPC .............. C02F 1/325; C02F 2201/3222; C02F 2201/3225; C02F 2303/04; C02F 2307/10; B67D 3/0032; B67D 2210/00015
See application file for complete search history.

(56) References Cited

U.S. PATENT DOCUMENTS 5,328,059 A * 7/1994 Campbell ................ B67D 3/00 222/189.09
5,698,091 A * 12/1997 Kuennen .................. C02F 9/20 210/232

(Continued)

FOREIGN PATENT DOCUMENTS

CN 107348841 A 11/2017
JP 3174477 U 3/2012

(Continued)

*Primary Examiner* — Sean Luck
(74) *Attorney, Agent, or Firm* — Smartpat PLC

(57) ABSTRACT

A bottled water dispenser with a system for treating water in a bottle with UV radiation, containing a water intake finger equipped with a source of UV radiation and configured to open the bottle sealed by a cap by pushing a valve installed in the centre of the cap inside to the bottle or by rupturing this valve, wherein a semiconductor LED is used as the source of UV radiation, the semiconductor LED is installed in a recess made at the end face of the water intake finger, so that when the bottle is opened with the water intake finger, the source is inside the bottle, and the radiation of the source is directed towards the water surface and towards the walls of the bottle, and wherein the semiconductor LED is protected by a quartz glass covering the recess.

11 Claims, 12 Drawing Sheets

(52) U.S. Cl.
CPC ................. *C02F 2201/3222* (2013.01); *C02F 2201/3225* (2013.01); *C02F 2303/04* (2013.01); *C02F 2307/10* (2013.01)

(56) References Cited

U.S. PATENT DOCUMENTS

| | | | | |
|---|---|---|---|---|
| 6,786,255 | B1 | 9/2004 | Lee | |
| 7,654,413 | B2 * | 2/2010 | Chang .................. | B67D 3/0029 222/83.5 |
| 11,215,145 | B2 * | 1/2022 | Duez .................. | F02M 25/0222 |
| 2008/0257910 | A1 * | 10/2008 | Chang ....................... | B67B 7/28 222/105 |
| 2010/0200769 | A1 * | 8/2010 | Matsuda .............. | B67D 1/0884 250/436 |
| 2014/0255257 | A1 * | 9/2014 | Pawlow .................... | C02F 1/78 422/186.12 |
| 2015/0298958 | A1 | 10/2015 | Orita | |
| 2015/0360924 | A1 | 12/2015 | Orita | |
| 2016/0002020 | A1 | 1/2016 | Orita et al. | |
| 2016/0083271 | A1 | 3/2016 | Chen et al. | |

FOREIGN PATENT DOCUMENTS

| | | | |
|---|---|---|---|
| JP | 2017210256 | A | 11/2017 |
| WO | 2016157124 | A1 | 10/2016 |

* cited by examiner

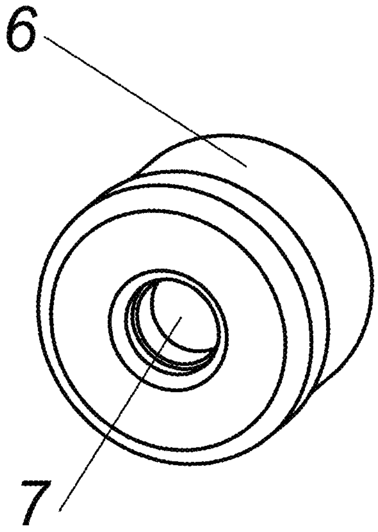
Fig.12a
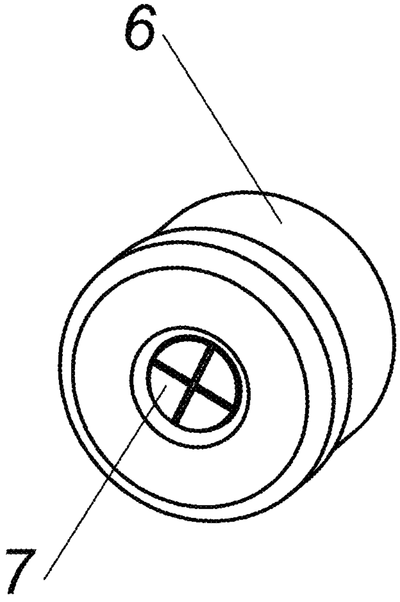
Fig.12b
Fig.12

BOTTLED WATER DISPENSER WITH A SYSTEM FOR TREATING WATER IN A BOTTLE WITH UV RADIATION

CROSS-REFERENCE TO RELATED APPLICATION

This application is Continuation of International Patent Application PCT/IB2024/055351, filed on May 31, 2024, which claims the benefit of European Patent Application EP 23177105.6 filed on Jun. 2, 2023.

TECHNICAL FIELD

The disclosure relates to bottled water dispensers and, in particular, to bottled water dispensers with a system for treating water in a bottle with UV radiation.

BACKGROUND

It is known that in order to prevent biological contamination of water in a bottle installed in a dispenser, a source of UV radiation can be used by installing it in such a way that UV radiation enters the bottle.

US2016083271A1 discloses a device for treating water in a container, such as a bottle, containing a case and a source of UV radiation placed in the case. The case is detachably connected to a hole in the container for contact with water in the container; a light emitting component is located on the case and emits UV to irradiate the water in the container. However, such a device is intended for batch sterilization of water and the device must be removed from the container before pouring water.

A bottled water dispenser is disclosed in JP2017210256A, in which it is proposed to use a UV LED placed at the end of the water intake finger for UV treatment of water in the bottle. This solution causes difficulties when installing an inverted bottle on the dispenser. Firstly, the bottle should be opened before installing it, which may result in water spilling out when the bottle is installed, as well as ingress of microorganisms into the open bottle. Secondly, there is a danger of damage to the LED by the neck of the bottle during its installation, since it is rather difficult to accurately position a heavy bottle, which also closes the person's view of the junction during installation.

Another bottled water dispenser is disclosed in JP3174477U; in this dispenser it is proposed to use semiconductor LEDs of UV radiation placed on the outer surface of the water intake finger for UV treatment of water in the bottle. However, this solution is designed for soft (collapsing) bottles, and in the case of hard bottles it will not be effective, since the radiation of the LEDs located on the side surface of the water intake finger is directed mainly horizontally and the radiation will not be enough for effective treatment of water and air space in the upper part of the bottle. In addition, in this design, for effective treatment of water in a bottle, several LEDs are required installed around the perimeter of the water intake finger.

The closest to the proposed technical solution is the dispenser described in WO2016157124A1. In this dispenser a UV lamp placed inside the water intake finger made of a material transparent to UV radiation is used for UV treatment of water in the bottle. When installing the bottle in the dispenser, the water intake finger opens the cap and passes into the bottle. However, this solution has a number of disadvantages.

Since UV radiation enters the bottle through the side walls of the water intake finger and is directed mainly horizontally, for effective treatment of water in the bottle, it is necessary to increase the length of the water intake finger, which reduces its strength and makes it difficult to install the bottle into the dispenser. And even that may not be enough to effectively treat the water and air space in the upper part of the bottle.

At the same time, the known plastic materials have a sufficiently low UV radiation transmittance, which requires an increase in the power of the source of UV radiation. And if quartz glass is used, which has a higher transmittance, then the water intake finger turns out to be more expensive and, most importantly, more fragile and therefore dangerous to use in case of its damage.

Moreover, the use of a UV lamp in the water intake finger is a source of increased danger, since when installing a heavy bottle, the water intake finger and, as a result, the lamp may be damaged, while the mercury vapour contained in the lamp, which is very hazardous to health, will enter the water and can cause serious harm to human health if not noticed in time.

In addition, placing the lamp in the water intake finger significantly reduces its throughput, since the lamp occupies most of the inner space of the finger.

For such a dispenser, in which a lamp is installed inside the water intake finger, a special cap is required with the force required to open it, which is lower compared to a standard cap. Therefore, this dispenser is not well suited for use with commonly used PET bottles closed with caps of Save Guard™ type and the like.

Such a bottle, usually three or five gallons (11 or 19 litres), is made of rigid plastic and, unlike the so-called collapsing bottles, retains its shape when the water is poured out. Such a bottle has a neck with an outer diameter of about 6 centimetres and is usually closed with a cap, in the middle part of which there is an internal hole with a diameter of about 18 millimetres, which is closed either by a valve to be pushed into the bottle or by a rupture valve. When installing such a bottle in a dispenser, the bottle is mounted on a water intake finger, which opens the bottle by pushing the valve into the bottle or rupturing it, depending on the type of cap.

When opening such a bottle, the water intake finger presses its end on the valve or partition with a force of 10 to 30 kilograms (100-300 N). Considering that the outer diameter of the water intake finger corresponds to the inner hole of the cap (approximately 18 millimetres), the water intake finger for this type of bottle is usually made of a durable plastic, such as ABS.

SUMMARY

The objects of the disclosure are to increase the reliability of the dispenser, to ensure efficient treatment of water in the bottle installed in the dispenser, using a source of UV radiation to be placed in the bottle when it is installed in the dispenser, and to ensure automatic opening of the bottle when it is installed in the dispenser. Automatic opening of the bottle at the time of its installation in the dispenser serves to prevent the ingress of microbiological contamination from the outside into the water in the bottle at the time of its installation on the dispenser.

These objects is achieved with a bottled water dispenser with a system for treating water in a bottle with UV radiation, containing a water intake finger equipped with a source of UV radiation and configured to open the bottle sealed by a cap by pushing a valve installed in the centre of the cap inside to the bottle or by rupturing this valve, wherein a semiconductor LED is used as the source of UV radiation, the semiconductor LED is installed in a recess made at the end face of the water intake finger, so that when the bottle is opened with the water intake finger, the source is inside the bottle, and the radiation of the source is directed towards the water surface and towards the walls of the bottle, and wherein the semiconductor LED is protected by a quartz glass covering the recess.

The dispenser may additionally comprise a frame structure fixed on the end face of the water intake finger. This frame structure makes it easier to open the cap with a rupture valve, which can be useful if the cap is made of a denser plastic.

The frame structure can be made in the form of rods forming a pyramid, the top of which is located on the axis of the water intake finger, above its end surface. At the same time, the number of rods forming a pyramid is at least three. This frame structure is strong enough to rupture the cap valve, but does not greatly obscure the source of UV radiation.

The upper part of the water intake finger can be made of metal. The fact that the upper part of the water intake finger is made of metal not only increases its strength, but also improves heat removal from the source of UV radiation.

Preferably, the quartz glass is installed in a recess below the upper surface of the water intake finger. Thus, quartz glass is better protected from damage or accidental scratches.

In some embodiments, the dispenser further comprises a water intake tube, and the water intake finger is provided with a channel made in such a way that the end of the intake tube can pass into the bottle through this channel, while the length of the intake tube is sufficient for the end of the water intake tube to reach the bottom of the bottle.

BRIEF DESCRIPTION OF THE DRAWINGS

FIG. 12 shows two types of bottle caps.

DETAILED DESCRIPTION

First Embodiment

Figure 1:
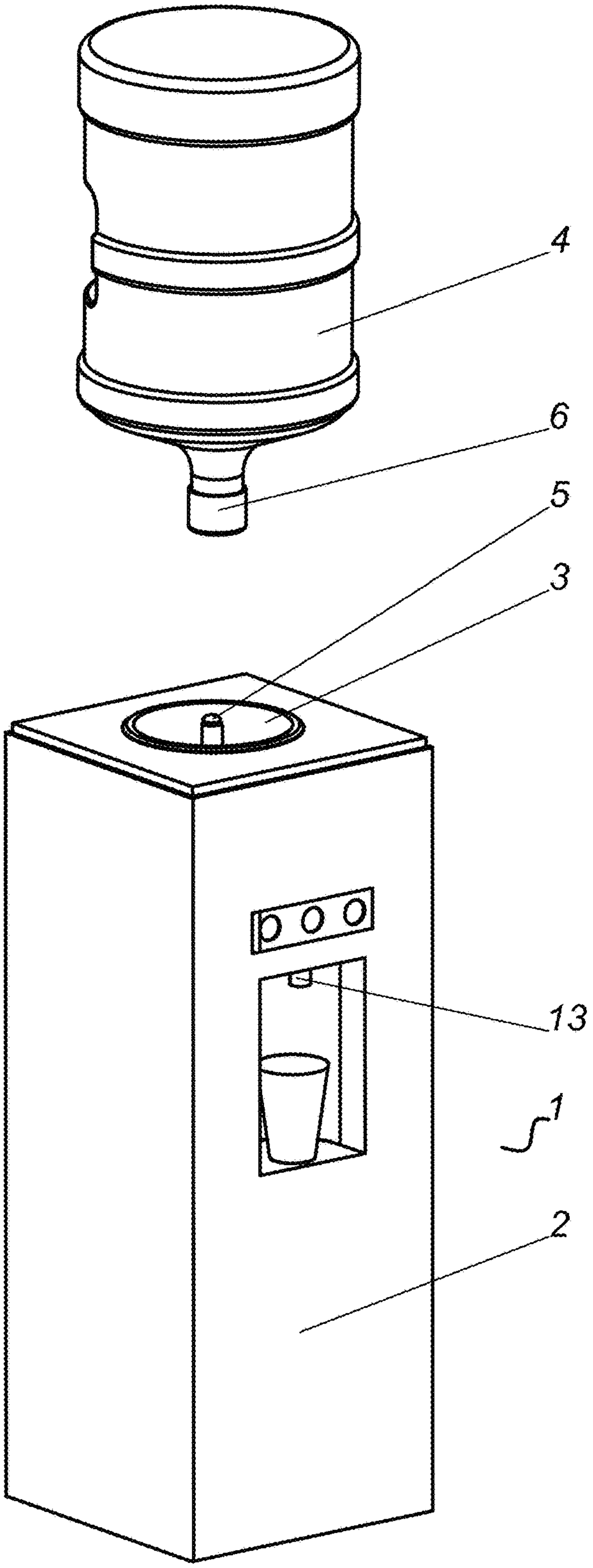
FIG. 1 shows the outside of the first embodiment of the bottled water dispenser.
Figure 2:
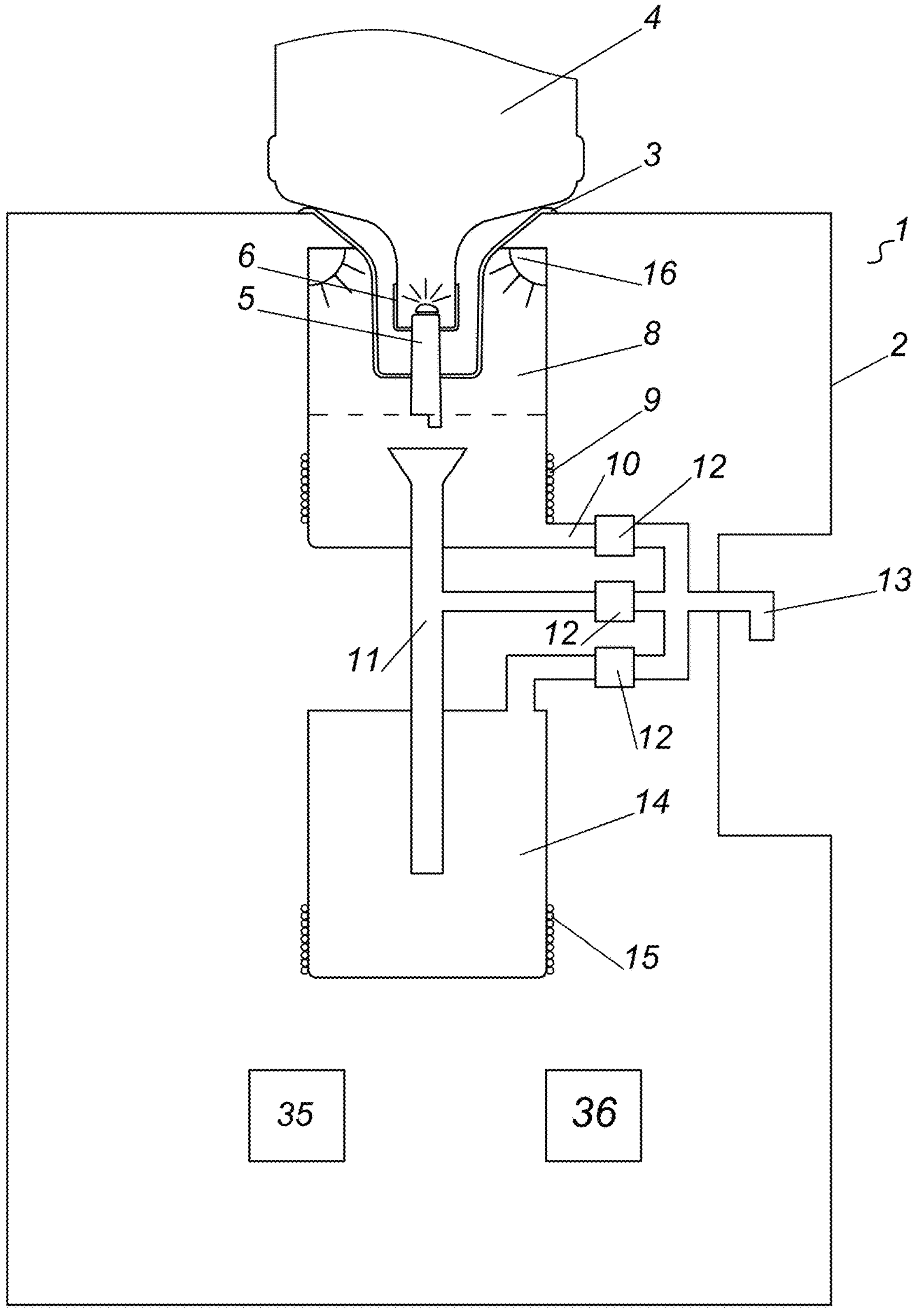
FIG. 2 shows the inside of the bottled water dispenser.

FIG. 1 shows the outside and FIG. 2 shows the inside of the bottled water dispenser. This dispenser is designed to use 3 or 5 gallon (11 or 19 litre) bottles of drinking water. The dispenser 1 contains a case 2, in the upper part of which there is a bottle receiver 3 for installing an inverted bottle 4. In the centre of the bottle receiver 3 there is a water intake finger 5, which, when the bottle 4 is installed in the dispenser 1, opens the bottle 4 by rupturing the valve of the cap 6 or by pushing this valve into the bottle 4. When installing a new bottle 4 in the dispenser 1, the bottle 4 is turned over and installed with the neck down into the bottle receiver 3. At the same time, when installing the bottle 4, the cap 6 of the bottle 4 abuts against the water intake finger 5, which ruptures the valve located in the centre of the cap 6 or pushes this valve into the bottle 4.

The water intake finger 5 is connected to the internal storage tank 8 equipped with a cooling device 9. The internal storage tank 8 has two outlets 10, 11, one for cold water 10 and the other for room temperature water 11. Outlet for cold water 10 and outlet for room temperature water 11 are connected through solenoid valves 12 to a common outlet 13 of the dispenser for dispensing water. The room temperature water outlet 11 is also connected to a hot water tank 14 provided with a heating device 15. The hot water tank 14 is connected through the solenoid valve 12 to the common outlet 15 of the dispenser 1.

To maintain the purity of water in the dispenser 1, several additional sources of UV radiation 16 are installed inside the storage tank 8. Sources of UV radiation 16 inside the storage tank 8 serve to maintain the microbiological purity of the water inside the tank 8. Semiconductor LEDs of the UV-C range are used as sources of UV radiation 16 inside the storage tank 8. The periodic switching on of these sources 16 helps to maintain the microbiological purity of water inside the storage tank 8. Since there is always a certain amount of microorganisms in the storage tank 8 that get there from the ambient air and possibly from the water in the bottle, then the number of microorganisms may exceed the values allowed for drinking water without periodic treatment of the water in the tank 8 with UV radiation.

The control device 35 and the power supply 36 to ensure the operation of the dispenser 1 are also installed in the case 2.

Figure 3:
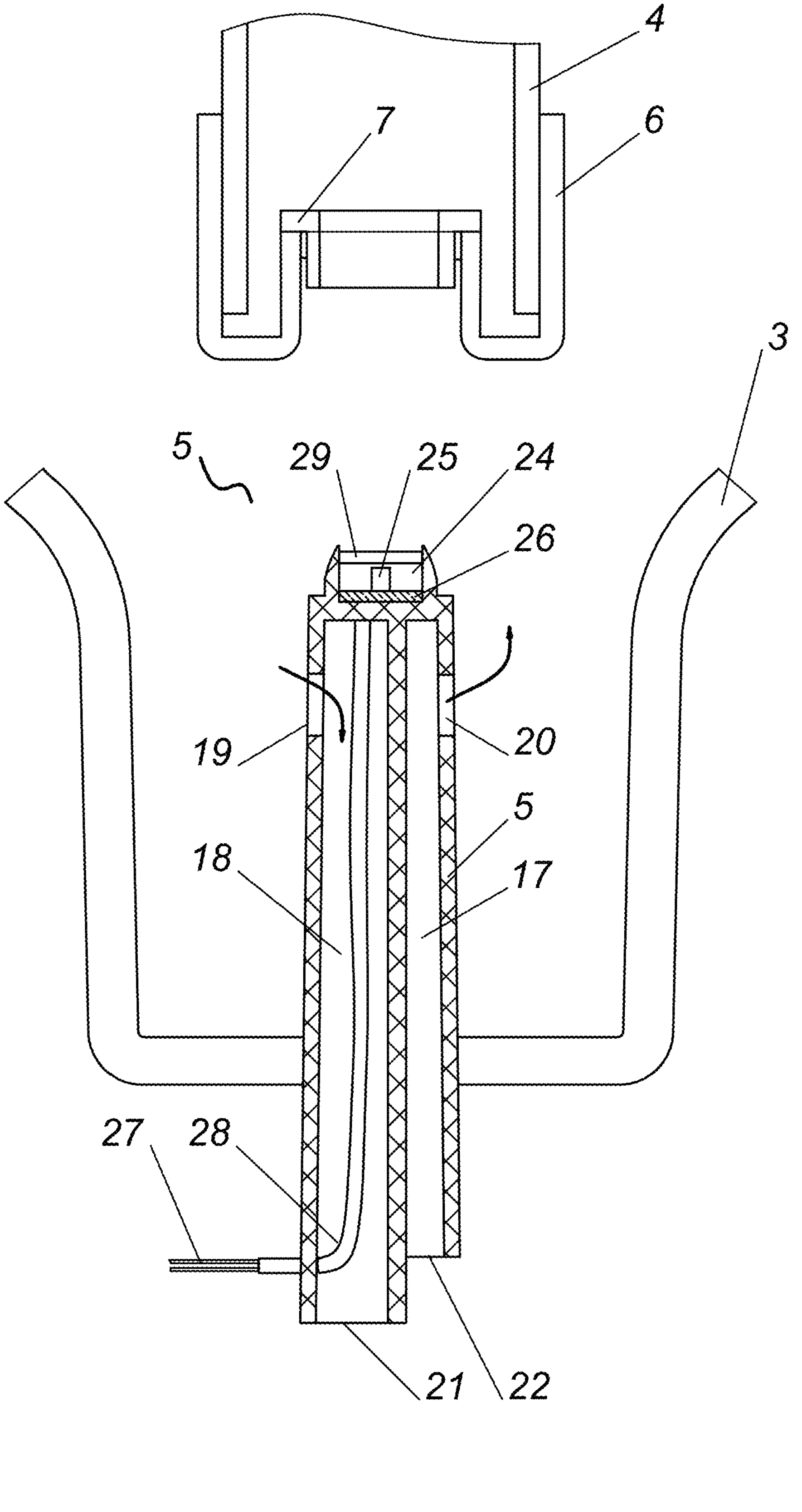
FIG. 3 shows the water intake finger in section.

FIG. 3 shows the water intake finger 5 in section. The water intake finger 5 is located in the central part of the bottle receiver 3. The water intake finger 5 has two internal channels, the air channel 17 through which air from the dispenser 1 enters the bottle 4, and the water channel 18 through which water from the bottle 4 enters the dispenser 1. In the upper part of the water intake finger 5 there are two holes, a water hole 19 and an air hole 20. In the lower part of the water intake finger 5 there is a water outlet 21 from the water channel 18 and an air inlet 22 into the air channel 17.

A source of UV radiation 25 is installed at the end face of the water intake finger 5. The source of UV radiation 25 is installed in the recess 24 made at the end face of the water intake finger 5. The source of UV radiation 25 is a semiconductor LED of UV-C radiation which is installed on the board 26. The power supply to the source of UV radiation 25 is carried out through the wires 27, which pass through the tunnel 28 made inside the water intake finger 5. The recess 24, in which the source of UV radiation 25 is placed, is closed from above with quartz glass 29. The source of UV radiation 25 treats the water and air inside the bottle with UV radiation. Since the maximum increase in the number of microbiological contamination occurs on the walls of the bottle and on the border of the water-air space of the bottle, the radiation of the source 25 is directed upwards, towards the water surface and towards the walls of the bottle.

It is known that microbiological contamination in water in a bottle of drinking water tends to increase after opening the bottle. It has been verified that in initially microbiologically pure water, the level of microbiological contamination in the bottle can exceed one hundred thousand CFU/ml (Colony Forming Units per millilitre) 14 days after the bottle is opened. While sanitary standards for drinking water provide for no more than 1000 CFU/ml.

Figure 4:
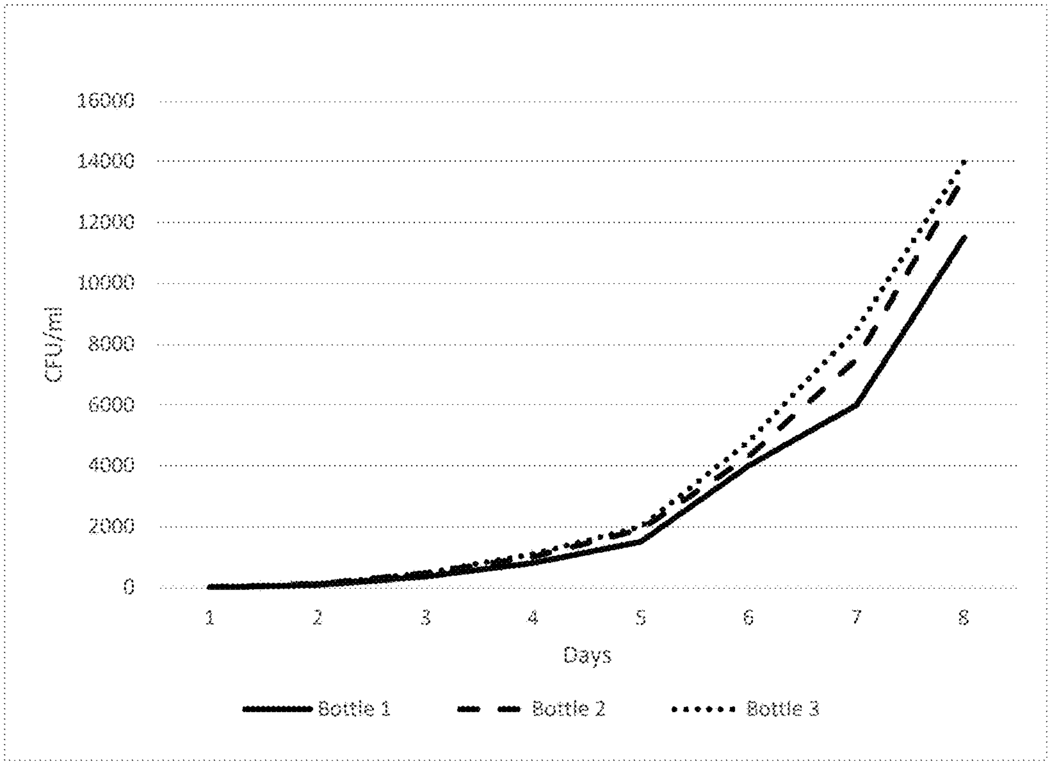
FIG. 4 shows a graph of the change in the level of microbiological contamination of water in the bottle without the use of UV radiation.

As an example, FIG. 4 shows the results of measuring microbiological contamination in an open bottle without using UV radiation to suppress the development of microbiological contamination. The X-axis shows the days after opening the bottle, the Y-axis shows the level of microbiological contamination in CFU/ml. It can be seen that the level of microbiological contamination may exceed the permissible sanitary standards already a week after the bottle was opened.

It is known, ultraviolet radiation is electromagnetic radiation with wavelengths just below the visible light spectrum (400-780 nm). UV radiation is divided into three groups: UV-A with a wavelength of 315-400 nm, UV-B with a wavelength of 280-315 nm and UV-C with a wavelength of 200-280 nm. Along with its visible spectrum, the sun also emits ultraviolet light. However, unlike UV-A and UV-B rays, the UV-C portion is almost completely absorbed by the earth's atmosphere. This is why microorganisms have not been able to develop proper UV-C resistance mechanisms. Therefore, the most effective portion of UV radiation to kill these organisms is UV-C, with an inactivation peak at 254 nm. Damage to microorganisms caused by UV-C radiation occurs directly at the DNA level. UV-C irradiation of the DNA molecule causes the thymine bases to form holes. Thus, the enzymes responsible for unwinding and copying DNA during replication are no longer able to function. This makes the microorganism unable to reproduce and cause infection. Thus, UV-C radiation has a bacteriostatic effect, and not primarily bactericidal. All water-borne enteric pathogens can be inactivated by ultraviolet light if exposed to a sufficient dose. Different microorganisms show different sensitivity to UV-C radiation.

It was experimentally found that in order to steadily reduce the microbiological contamination of water in a 19-litre bottle, it is sufficient to periodically treat the water, and the source of UV radiation can be of relatively low power.

Figure 5:
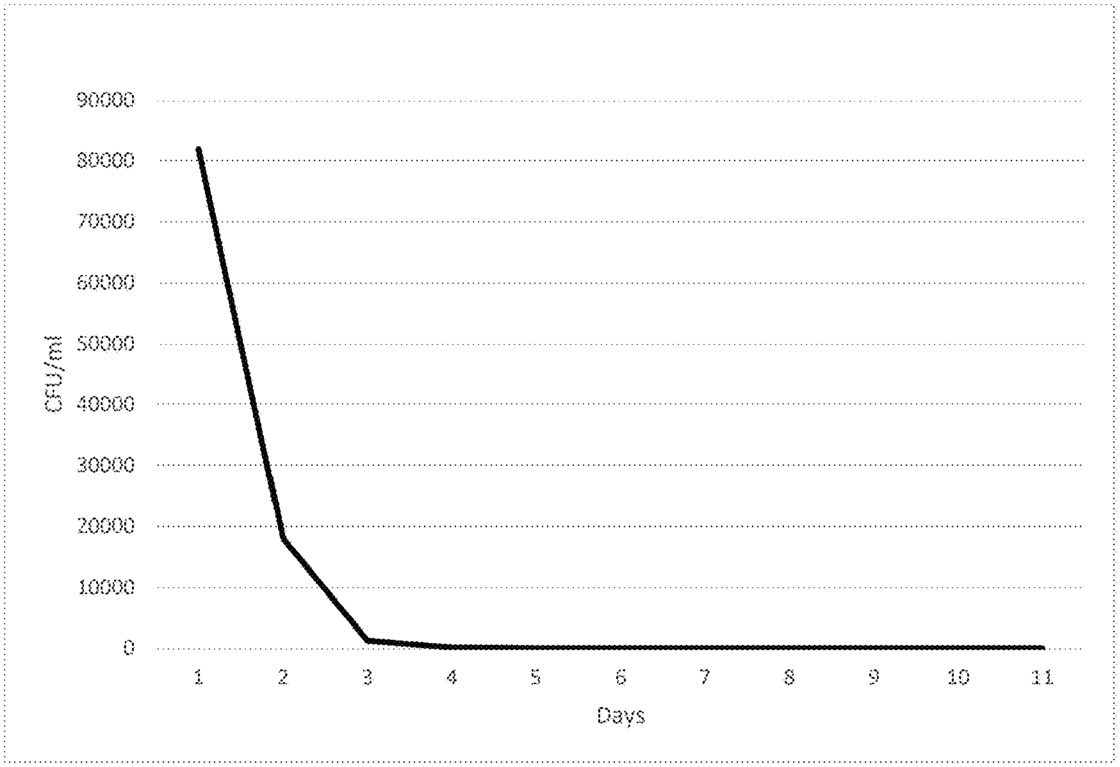
FIG. 5 shows a graph of the change in the level of microbiological contamination in the bottle with periodic switching on of the source of UV radiation.

FIG. 5 shows the results of changing the microbiological contamination of water when the source of UV radiation is switched on once an hour for ten minutes and an optical power of the source is 30 mW at an average radiation frequency of 270 nm. Thus, the relatively weak radiation of the source of UV radiation placed in a bottle of water can significantly reduce the possibility of microbiological contamination of water in the dispenser and the danger of dispensing contaminated water to the consumer.

The dispenser works as follows. When installing a new full bottle 4, the bottle 4 is turned upside down and lowered into the bottle receiver 3, so that the neck of the bottle 4 is put on the water intake finger 5. In this case, the water intake finger 5 first abuts against the valve 7 of the cap 6 and then, when the bottle 4 is further lowered, it opens the bottle by rupturing the valve 7 or pushing this valve into the bottle 4. After the water intake finger 6 has entered the bottle 4, water from the bottle 4 begins to flow into the dispenser 1 through the water channel 18 of the water intake finger 5, and the air from the dispenser 1, through the air channel of the water intake finger 17, enters the bottle 4, replacing the water flowing out of the bottle 4.

In order to place the source of UV radiation 25 inside the bottle 4, the source 25 is installed on the upper end surface of the water intake finger 5. Thus, when the bottle 4 is opened with the water intake finger 5, the source 25 is inside the bottle 4. In order not to damage the source of UV radiation 25 when opening the bottle 4, the source is installed in the recess 24 and covered with quartz glass 29.

When filling the internal storage tank 8 with water, the water blocks the air inlet 22 of the air channel 17, and since the air no longer enters the bottle 4, the flow of water from the bottle 4 also stops. When water is dispensed from the dispenser 1, the water level in the storage tank 8 decreases, thereby opening up air access to the bottle 4, and water begins to flow from bottle 4 into the dispenser 1 until the raised water level again cuts off the air supply to the bottle 4.

During the operation of the dispenser, the control device 35 switches on the source of UV radiation 25 installed in the water intake finger 5 with a predetermined frequency to prevent the development of microbiological contamination of water in the bottle. The control device 35 also controls the operation of additional sources of UV radiation 16 installed in the storage tank 8 to prevent the development of microbiological contamination in it.

The presence of additional sources of UV radiation 16 in the storage tank 8 improves the microbiological state of the dispenser; however, additional sources of UV radiation 16 inside the dispenser cannot replace the source of UV radiation 25 in the bottle. Firstly, because the more contaminated the water entering the dispenser, the more powerful UV radiation is required to treat the water inside the dispenser. Therefore, when water pollution in the bottle increases, for example, in case of a long break in the operation of the dispenser, which can reach a month or even more, the installed capacity of sources of UV radiation inside the dispenser may not be enough for reliable water treatment. And, secondly, when water is dispensed to the consumer, the water dispensed from the dispenser is replaced by water from the bottle. At the same time, due to the mixing of water from the bottle with water inside the dispenser, some of the microbiologically contaminated water from the bottle can immediately get to the consumer, bypassing treatment with UV radiation inside the storage tank 8. Especially when dispensing room temperature water to the consumer, since room temperature water is taken from the upper layer of water in the storage tank 8, and water from the bottle also enters the upper layer of water in the storage tank 8.

Such a water intake finger 5 as shown in FIG. 3 can open caps with either a valve to be pushed into the bottle or a rupture valve. Examples of such caps are shown in FIGS. 12*a* and *c*. When opening the cap 6 with the valve 7 to be pushed inside the bottle, FIG. 12*a*, the extreme edge of the water intake finger 5 abuts against the edge of the valve 7, pushing it inside the bottle 4. And when opening the cap with the rupture valve, FIG. 12*c*, the upper part of the water intake finger 5 abuts against the rupture valve and ruptures it.

Figure 6:
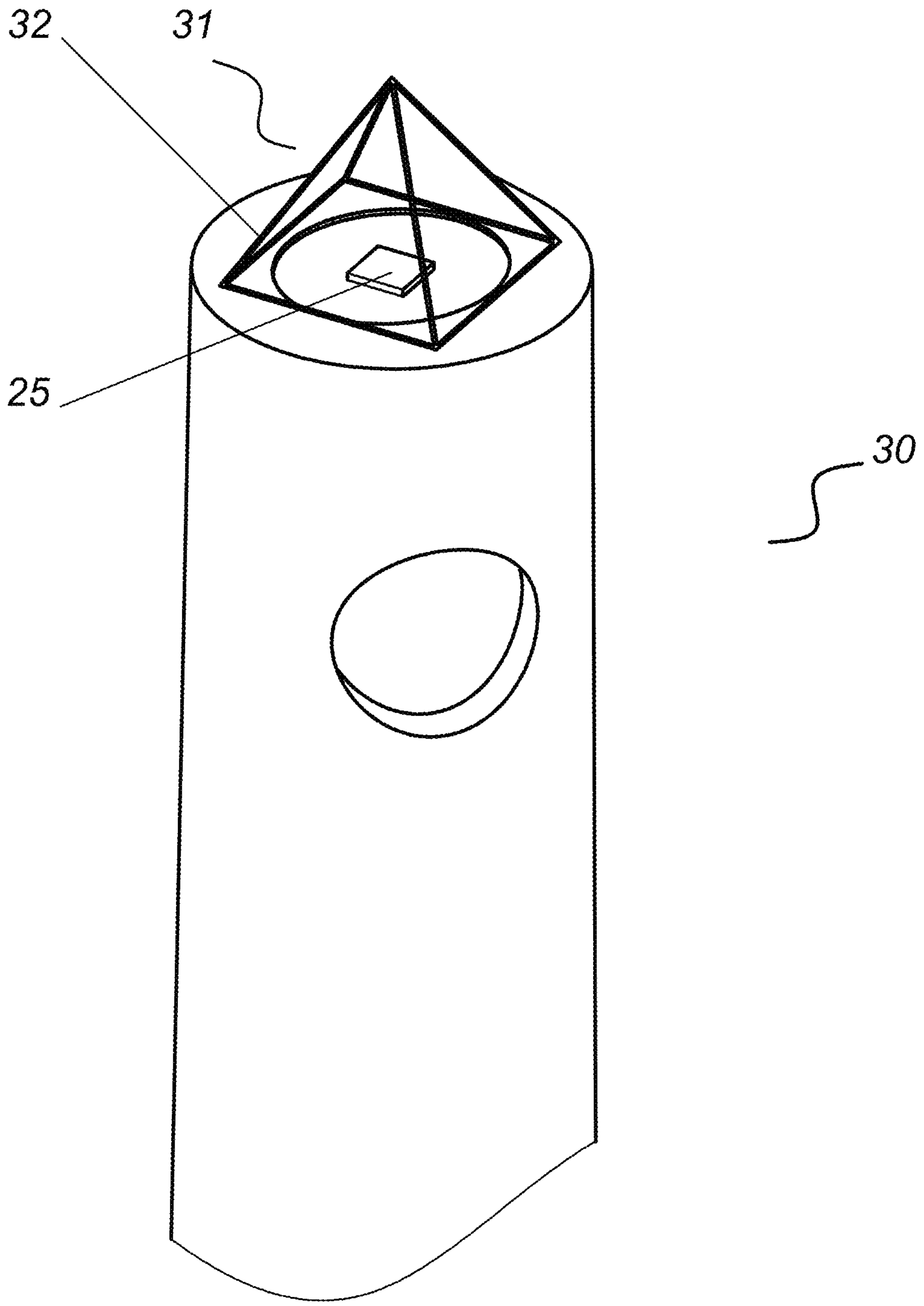
FIG. 6 shows an embodiment of the water intake finger.

FIG. 6 shows another embodiment of the water intake finger. The water intake finger 30, in comparison with the water intake finger 5 shown in FIG. 3, additionally contains a frame structure 31 fixed on the end face of the water intake finger 30. The frame structure 31 is made in the form of four rods 32 forming a pyramid, the top of which is located on the axis of the water intake finger 30, above its end surface. The frame structure 31 makes it easier to open the bottle 4 with the cap 6 containing the rupture valve. When opening, the pointed end of the frame structure abuts against the centre of the valve, and since the force is applied to the tip, the area of which is significantly less than the area of the end surface of the finger, the tip easily ruptures the cap valve.

In order for such a water intake finger 30 to be able to open a cap 6 with a valve to be pushed 7, the height of the frame structure 31 is made less than the depth of the valve 7. Therefore, when opening such caps, the water intake finger 30 abuts against the valve 7 with the edge of the end surface and pushes it inside the bottle. In this case, the top of the pyramid or the pointed end of the frame structure does not reach the bottom of the valve 7 and does not participate in the opening of the bottle. Since the frame structure 31 is made of relatively thin rods with an open space between them, it does not interfere with UV radiation from the source 25 located underneath.

Figure 7:
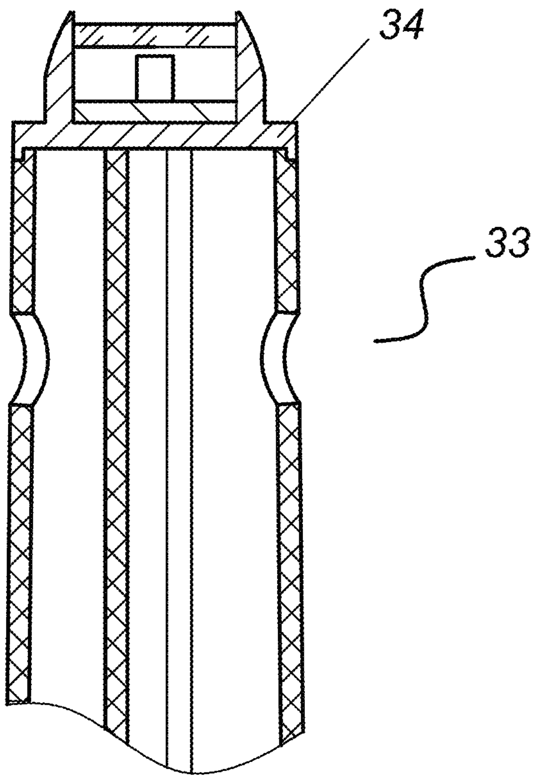
FIG. 7 shows an embodiment of the water intake finger.

FIG. 7 shows another embodiment of the water intake finger. The main difference between this embodiment and that shown in FIG. 2 and FIG. 3 is that the main part of the water intake finger 33 is made of plastic, as in the previous embodiments, but the upper part 34 is made of metal, for example, stainless steel. The fact that the upper part 34 of the water intake finger is made of metal, on the one hand, increases the strength of that part of the water intake finger, which bears the main load when opening the bottle, and, on the other hand, improves heat removal from the source of UV radiation.

Second Embodiment

Figure 8:
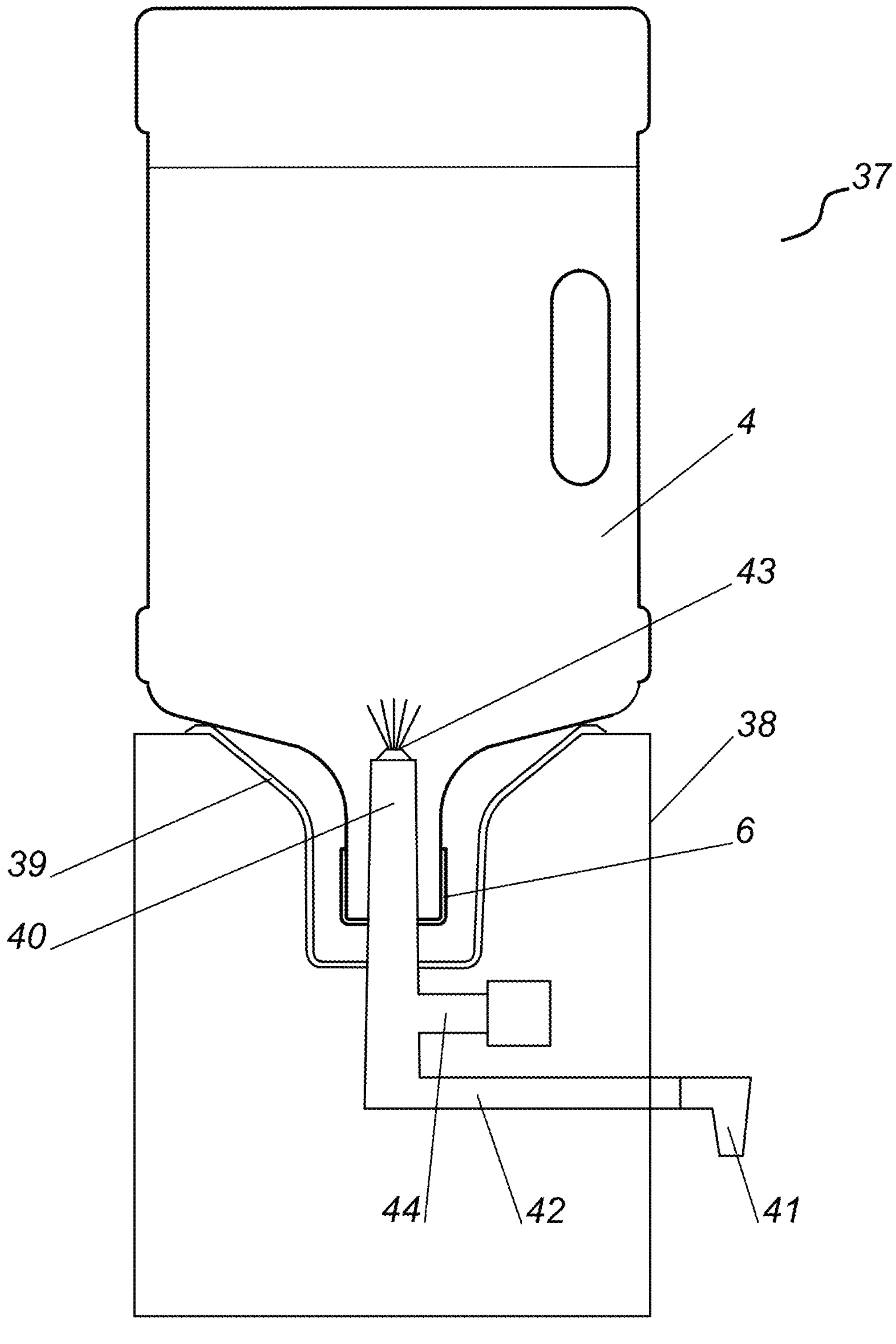
FIG. 8 shows a second embodiment of the bottled water dispenser.

FIG. 8 shows a desktop embodiment of the dispenser. The dispenser 37 contains a case 38 in the upper part of which there is a bottle receiver 39 for installing an inverted bottle 4. In the centre of the bottle receiver 39 there is a water intake finger 40, which, when the bottle 4 is installed in the dispenser 37, opens the bottle 4 by pushing the cap valve into the bottle 4. Unlike dispenser 1, this dispenser 37 is designed to dispense only room temperature water and does not contain an internal storage tank. The water intake finger 40 is connected to the outlet valve 41 by pipeline 42. The air enters the bottle 4 through the air channel 44 of the water intake finger connected to an air filter and equipped with a check valve.

At the end of the water intake finger 40, a source of UV radiation 43 is installed, which is connected to a control device (not shown) and a power supply (not shown) installed in the case 38. The control device provides periodic switching on of the source of UV radiation to maintain the microbiological purity of the water in the bottle 4. In this design, the presence of the source of UV radiation in the bottle is especially useful, since the water from the bottle immediately goes to the consumer and is not subjected to additional UV treatment inside the dispenser. Otherwise, the design of the water intake finger 40 with the source of UV radiation 43 does not differ from the water intake finger 5 in the first embodiment of the dispenser shown in FIG. 3.

Third Embodiment

Figure 9:
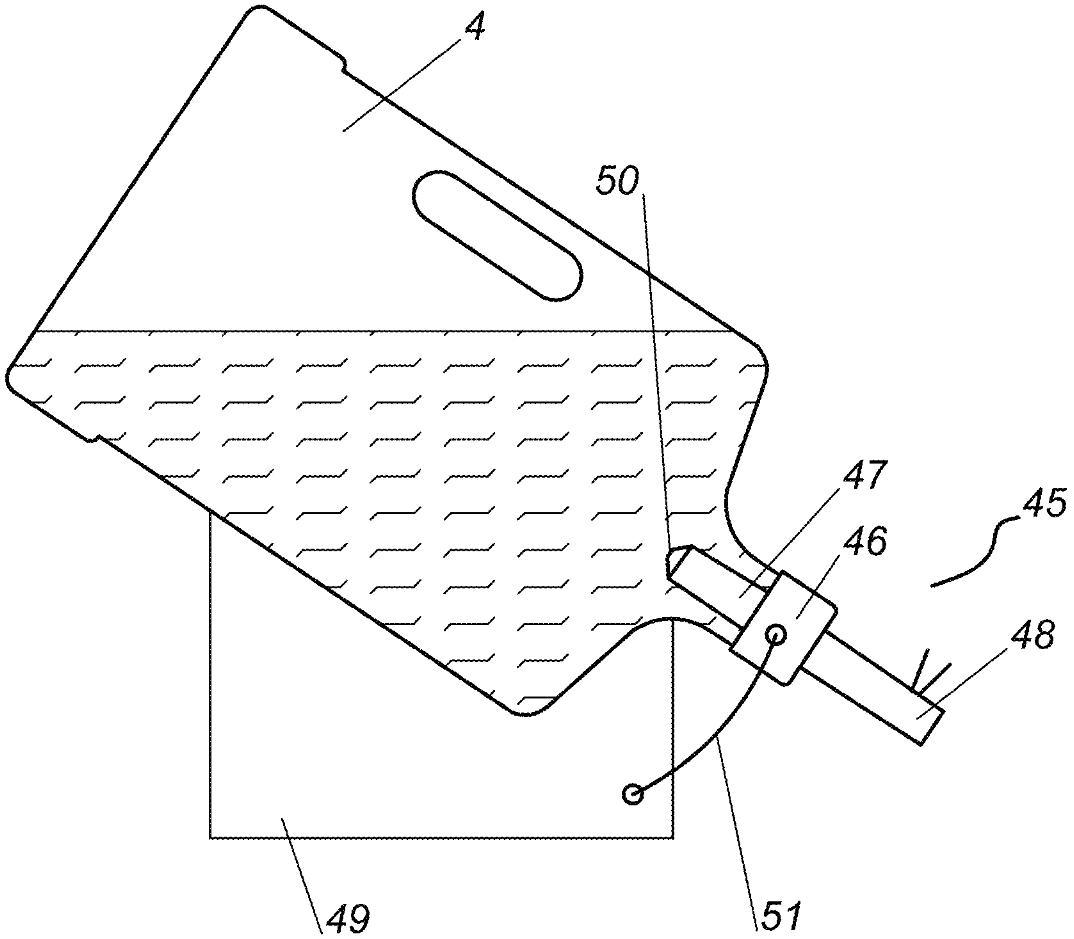
FIG. 9 shows another possible embodiment of the dispenser.

FIG. 9 shows another possible embodiment of the dispenser. In this embodiment, the dispenser 45 consists of a fastening 46 to be put on the neck of the bottle 4, a water intake finger 47 and an outlet valve 48 connected to the water intake finger 47, which are connected together. The dispenser 45 is fixed directly on the neck of the bottle 4, which is installed with the neck down, at an angle approximately 45 degrees from vertical on a stand 49. In this embodiment, the dispenser 45 is first put on the neck of the bottle 4, which is with its neck up, while the water intake finger 47 opens the bottle 4, pushing or punching the cap valve 6. After installing the dispenser 45 on the neck of the bottle 4, the bottle 4 is turned over and placed on the stand 49. The stand 49 also contains a control device (not shown) and a power supply (not shown) to ensure the operation of the source of UV radiation 50 installed at the end face of the water intake finger 47. After installing the bottle 4 on the stand, the dispenser 45 is connected to the stand with an electric cable 51. Otherwise, the design and operation of the dispenser 45 are similar to that of the dispenser shown in FIG. 8.

Fourth Embodiment

Figure 10:
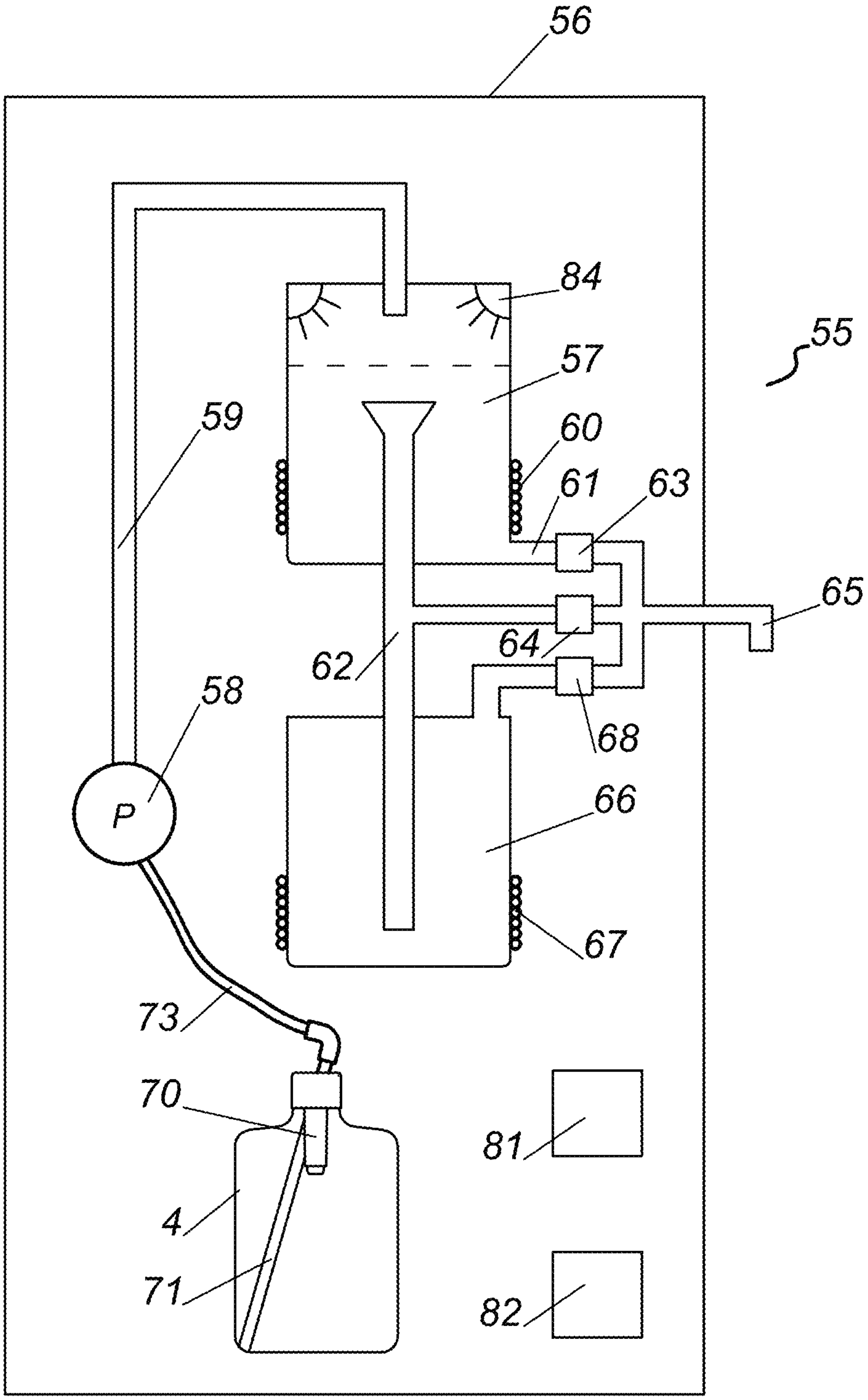
FIG. 10 shows another possible embodiment of the dispenser.

FIG. 10 shows another possible embodiment of the dispenser. The main difference between the dispenser 55 shown in FIG. 10 and the dispenser 1 shown in FIG. 2 is that the bottle 4 is located in the lower part of the case 56 in the position with the neck up. In this configuration, water from the bottle 4 is supplied to the storage tank 57 using a water pump 58, which is connected to the storage tank 57 by a pipeline 59. Otherwise, the design of the dispenser 55 is similar to the design of the dispenser in FIG. 2. The internal storage tank 57 provided with a cooling device 60 has a cold water outlet 61 and a room temperature water outlet 62. The cold water outlet 61 and the room temperature water outlet 62 are connected via solenoid valves 63, 64 to a common outlet 65 for dispensing water. The room temperature water outlet 62 is also connected to a hot water tank 66 provided with a heating device 67. The hot water tank 66 is connected through the solenoid valve 68 to the common outlet 65 of the dispenser 55.

The case 56 also contains the control device 82 and the power supply 83 to ensure the operation of the dispenser 55.

Figure 11:
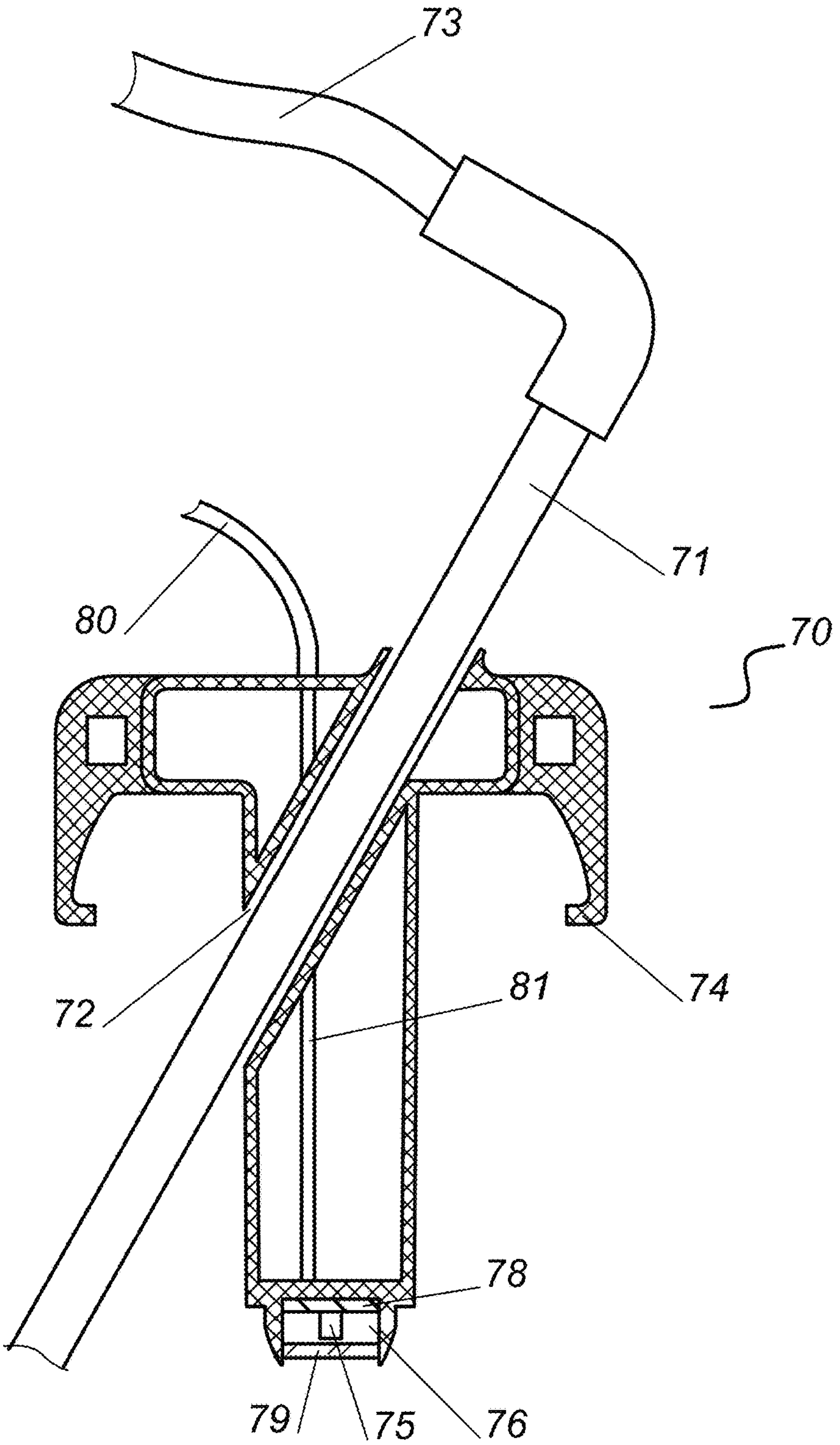
FIG. 11 shows an embodiment of the water intake finger.

The design of the water intake finger 70 is shown in FIG. 11. Since the water intake finger 70 is above the water level in the bottle 4 when the bottle 4 is placed with the neck up, the dispenser is additionally equipped with a water intake tube 71, which, after opening the bottle 4 with the water intake finger 70, is inserted into the bottle 4 through the channel 72 made in the water intake finger 70. The intake tube 71 is long enough to reach the bottom of the bottle 4. The water intake pipe 71 is connected to the pump 58 using a flexible pipeline 73.

To prevent the development of microbiological contamination in the bottle after opening it, a source of UV radiation 75 is installed at the end face of the water intake finger 70. The source of UV radiation 75 is installed in the recess 76 made at the end face of the water intake finger 70. The source of UV radiation 75 is a semiconductor LED installed on the board 78. The recess 76, in which the source of UV radiation 75 is placed, is covered with quartz glass 79. The power supply to the source of UV radiation 75 is carried out through the wires 80, which pass through the tunnel 81 made inside the water intake finger 70.

To maintain the purity of the water inside the dispenser, several sources of UV radiation 84 are also installed in the storage tank 57. Sources of UV radiation 84 inside the storage tank 57 serve to maintain the microbiological purity of the water inside the tank 57.

When a new bottle 4 is installed in the dispenser 55, first, the bottle 4 is opened with the water intake finger 70 by pushing the water intake finger 70 through the cap 6, then the water intake finger 70 is fixed on the neck of the bottle 4, for example, using the flange 74. After that, a water intake tube 71 is passed through the channel 72 of the water intake finger 70 and the water intake tube 71 is connected to the pump 58 by a flexible pipeline 73.

Fifth Embodiment

Figure 13:
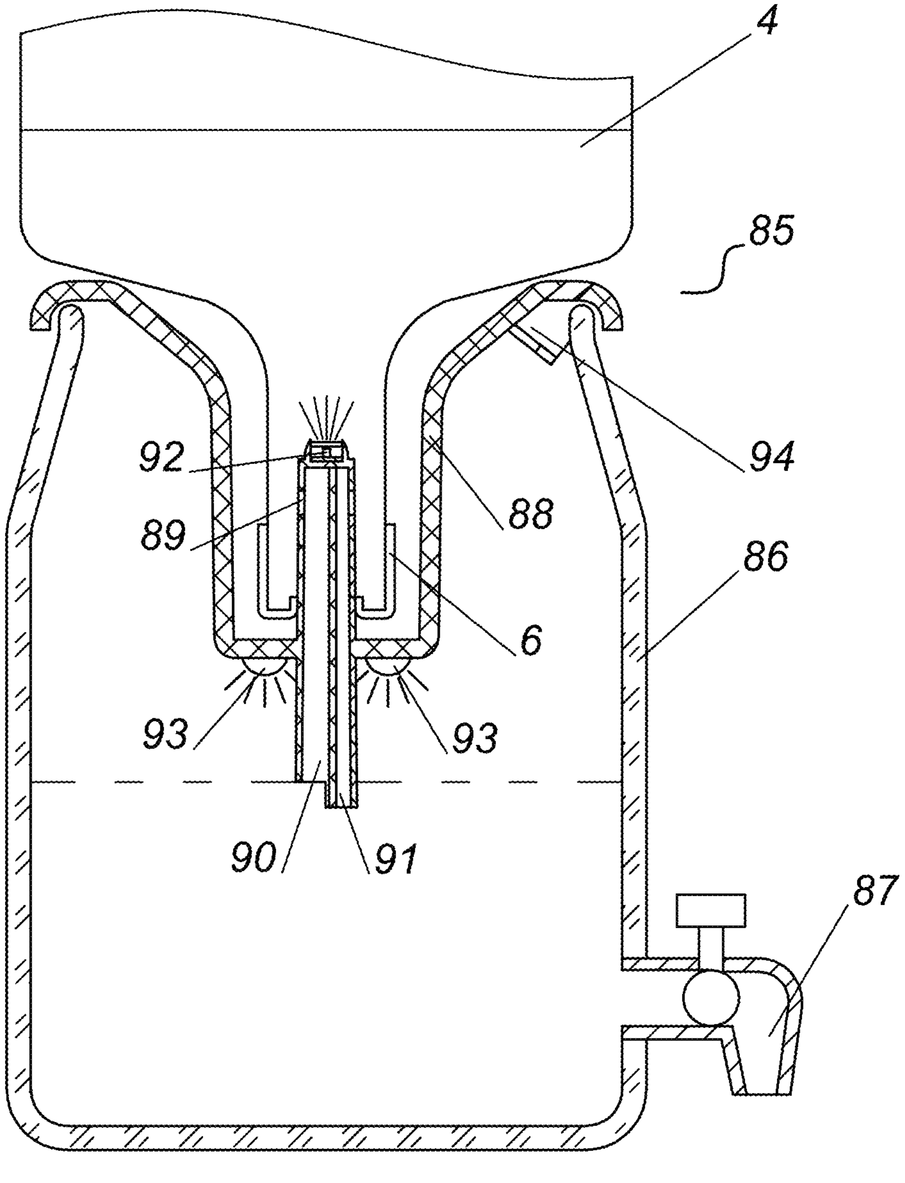
FIG. 13 shows another embodiment of the dispenser.

FIG. 13 shows another possible embodiment of the dispenser. In this embodiment, the dispenser 85 consists of a storage tank 86 provided with an outlet valve 87, a bottle receiver 88 installed in the upper part of the storage tank 86 and a water intake finger 89 installed in the centre of the funnel of the bottle receiver 88.

The water intake finger 89 has two internal channels, the air channel 90 through which air from the dispenser 85 enters the bottle 4, and the water channel 91 through which water from the bottle 4 enters the dispenser 85. To clean the outside air entering the dispenser, the dispenser 85 is equipped with an air filter 94.

A source of UV radiation 92 is installed in the recess made at the end face of the water intake finger 89. The source of UV radiation 92 is a semiconductor LED. The recess, in which the source of UV radiation 92 is installed, is covered with quartz glass from above. The source of UV radiation 92 is connected to an external control device and a power supply. The control device ensures periodic switching on of the source of UV radiation 92 to maintain the microbiological purity of water in the bottle 4.

To maintain the microbiological purity of water in the storage tank 86, several additional sources of UV radiation 93 are installed in it. Additional sources of UV radiation 93 are also connected to the control device and the power supply.

Thus, the proposed invention makes it possible to place a source of UV radiation in a bottled water dispenser in such a way as to effectively treat the water and air space in the bottle, while maintaining the function of automatic opening of the bottle using a water intake finger when the bottle is installed in the dispenser.

REFERENCE SIGNS LIST

1. dispenser
2. case
3. bottle receiver
4. bottle
5. water intake finger
6. bottle cap
7. cap valve
8. storage tank
9. cooling device
10. cold water outlet (from the tank)
11. room temperature water outlet (from the tank)
12. solenoid valve
13. common outlet for dispensing water
14. hot water tank
15. heating device
16. source of UV radiation in the storage tank
17. air channel (of the finger)
18. water channel (of the finger)
19. water hole (in the finger)
20. air hole (in the finger)
21. water outlet (in the finger)
22. air inlet (in the finger)
24. recess (in the finger)
25. source of UV radiation (semiconductor LED)
26. board
27. wires
28. tunnel (for wires)
29. quartz glass
30. water intake finger, embodiment 2
31. frame structure
32. rod
33. water intake finger, embodiment 3
34. upper part of the finger made of metal
35. control device
36. power supply
37. dispenser, embodiment 2
38. case
39. bottle receiver
40. water intake finger
41. outlet valve
42. pipeline
43. source of UV radiation
44. air channel
45. dispenser, embodiment 3
46. mount
47. water intake finger
48. outlet valve
49. stand
50. source of UV radiation
51. cable
55. dispenser, embodiment 4
56. case
57. storage tank
58. pump
59. pipeline
60. cooling device
61. cold water outlet
62. room temperature water outlet
63. solenoid valve
64. solenoid valve
65. common outlet
66. hot water tank
67. heating device
68. solenoid valve
70. water intake finger
71. water intake tube
72. channel in the intake finger
73. flexible pipeline
74. flange
75. source of UV radiation
76. recess
78. board
79. quartz glass
80. wires
81. tunnel
82. control device
83. power supply
84. source of UV radiation in storage tank
85. dispenser (embodiment 5)
86. storage tank
87. outlet valve
88. bottle receiver
89. water intake finger
90. air channel
91. water channel
92. source of UV radiation
93. source of UV radiation
94. air filter

The invention claimed is:

1. A dispenser (1) for bottled water, comprising:

a system for treating water in a bottle (4) with UV radiation to disinfect water and air in the bottle (4), including a water intake finger (5) equipped with a UV light-emitting diode (UV LED, 25) and configured to open the bottle (4) sealed by a cap (6) by pushing a valve (7) installed in a center of the cap (6) into the bottle (4) or by rupturing the valve, wherein the UV LED is disposed in a recess (24) at an end face of the water intake finger (5), such that when the bottle (4) is opened and the end face of the water intake finger (5) enters the bottle (4), the UV LED (25) is positioned inside the bottle (4), and emits the UV radiation towards a water surface and towards bottle walls, wherein the UV LED is covered by a quartz glass (29) that closes the recess (24), and wherein the recess (24) is confined to an axial end portion of the water intake finger (5) and defines an enclosed chamber at the end face, the enclosed chamber being closed by the quartz glass (29) and isolated from fluid flow through the water intake finger by disposing it above a water inlet.

2. The dispenser according to claim 1, further comprising a frame structure (31) fixed on the end face of the water intake finger (5).

3. The dispenser according to claim 2, wherein the frame structure (31) comprises a plurality of rods (32) forming a pyramid having an apex located along an axis of the water intake finger (30) above the end face.

4. The dispenser according to claim 3, wherein the pyramid comprises at least three of the rods (32).

5. The dispenser according to claim 1, wherein an upper part (34) of the water intake finger (33) is made of metal.

6. The dispenser according to claim 1, wherein the quartz glass (29) is installed in the recess (24) below an upper surface of the water intake finger (5).

7. The dispenser according to claim 1, further comprising a water intake tube (71), wherein the water intake finger (70) includes a channel (72) configured to allow an end of the water intake tube (71) to extend through the channel (72) into the bottle (4), and wherein a length of the water intake tube (71) is sufficient for the end of the water intake tube (71) to reach a bottom of the bottle (4).

8. The dispenser according to claim 1, wherein the water intake finger (5) comprises a water channel (18), and the water inlet in form of a water hole (19) formed in a lateral wall of the water intake finger (5) in an upper part thereof and in communication with the water channel (18).

9. The dispenser according to claim 8, wherein the water intake finger (5) further comprises an air channel (17), and an air hole (20) formed in the lateral wall of the water intake finger (5) in the upper part thereof and in communication with the air channel (17), the air hole (20) being positioned below the recess (24).

10. The dispenser according to claim 1, wherein the water intake finger (5) is made of plastic.

11. A dispensing system for dispensing water from a water bottle, comprising:

the water bottle comprising a sealing cap with a valve, wherein the valve is a pushing valve or rupture valve disposed in a center of the sealing cap, a water intake finger configured to open the water bottle by penetrating the valve, such that the water intake finger is disposed at least partially inside the water bottle, the water intake finger comprising a top end portion and an intermediate portion adjacent the top end portion, the top end portion defining an enclosed waterproof recess chamber, and the intermediate portion defining one or more fluid flow channels configured to allow fluids to enter and/or exit the water bottle through the water intake finger for dispensing water, a UV LED disposed inside the enclosed waterproof recess chamber, the UV LED being separated from the one or more fluid flow channels by an isolating partition on a bottom side and sealed on a top side by quartz glass, the UV LED being configured to emit UV radiation through the quartz glass to disinfect the fluids inside the water bottle, the fluids comprising both water and air.

* * * * *